Dec. 1, 1964  A. WESSTROM ETAL  3,158,930
METHOD OF MANUFACTURING ASSEMBLY FLUID PRESSURE MOTORS
Filed May 1, 1961  5 Sheets-Sheet 5
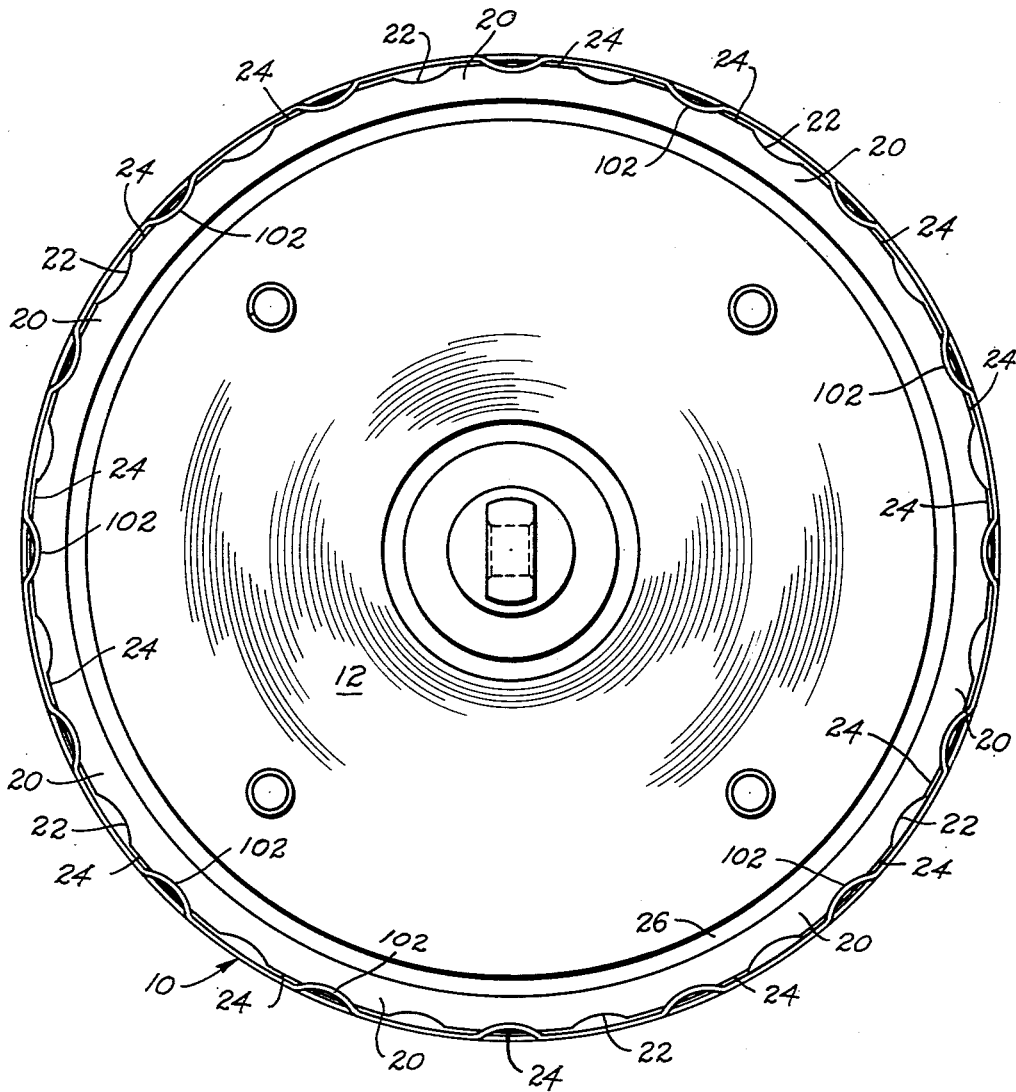
FIG_5
INVENTORS
ALFRED WESSTROM.
WILBUR E. SANDERS JR.
RUSSELL C. MOLLIS.
BY William P. Hickey
ATTORNEY United States Patent Office 3,158,930
Patented Dec. 1, 1964

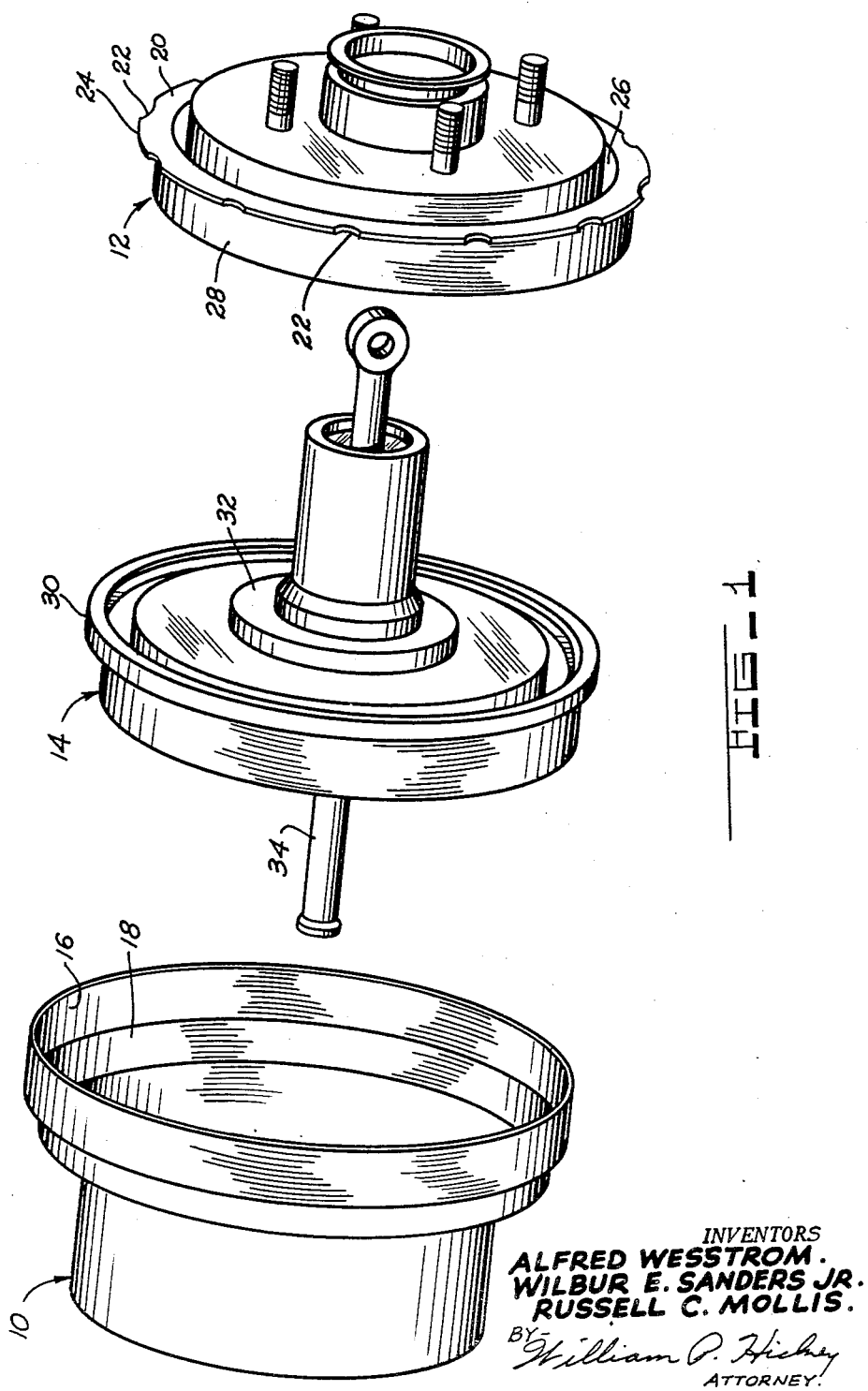

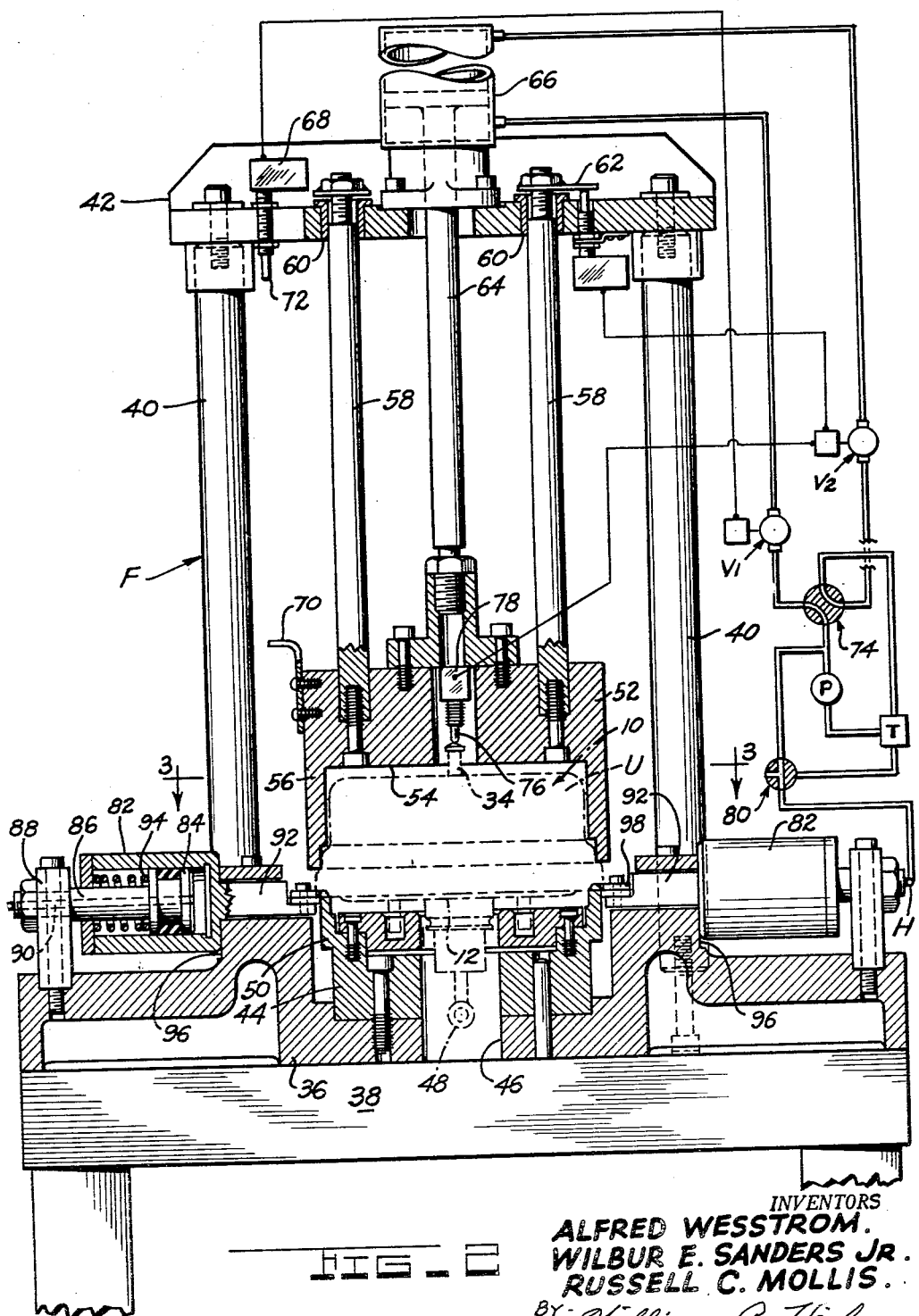

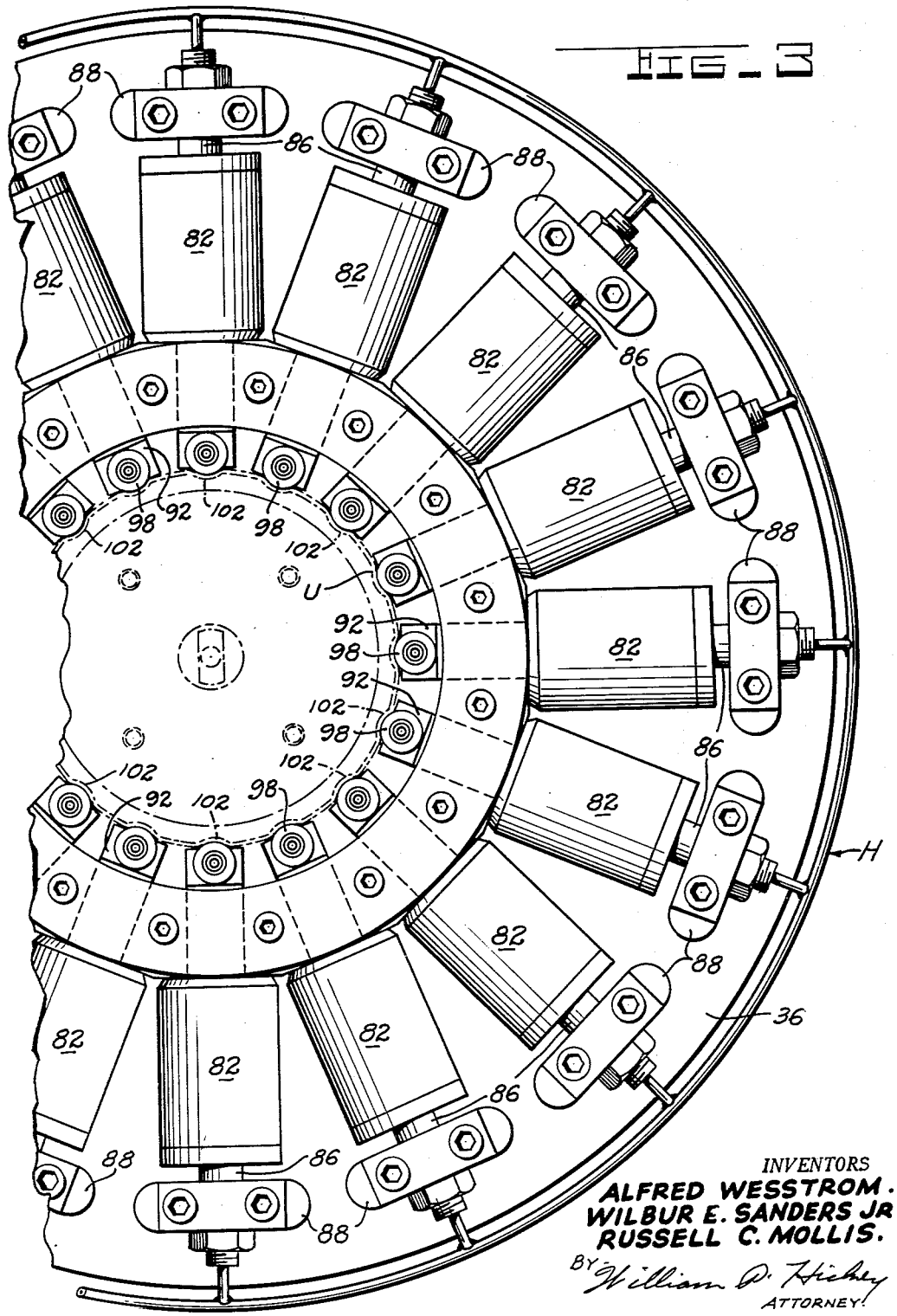

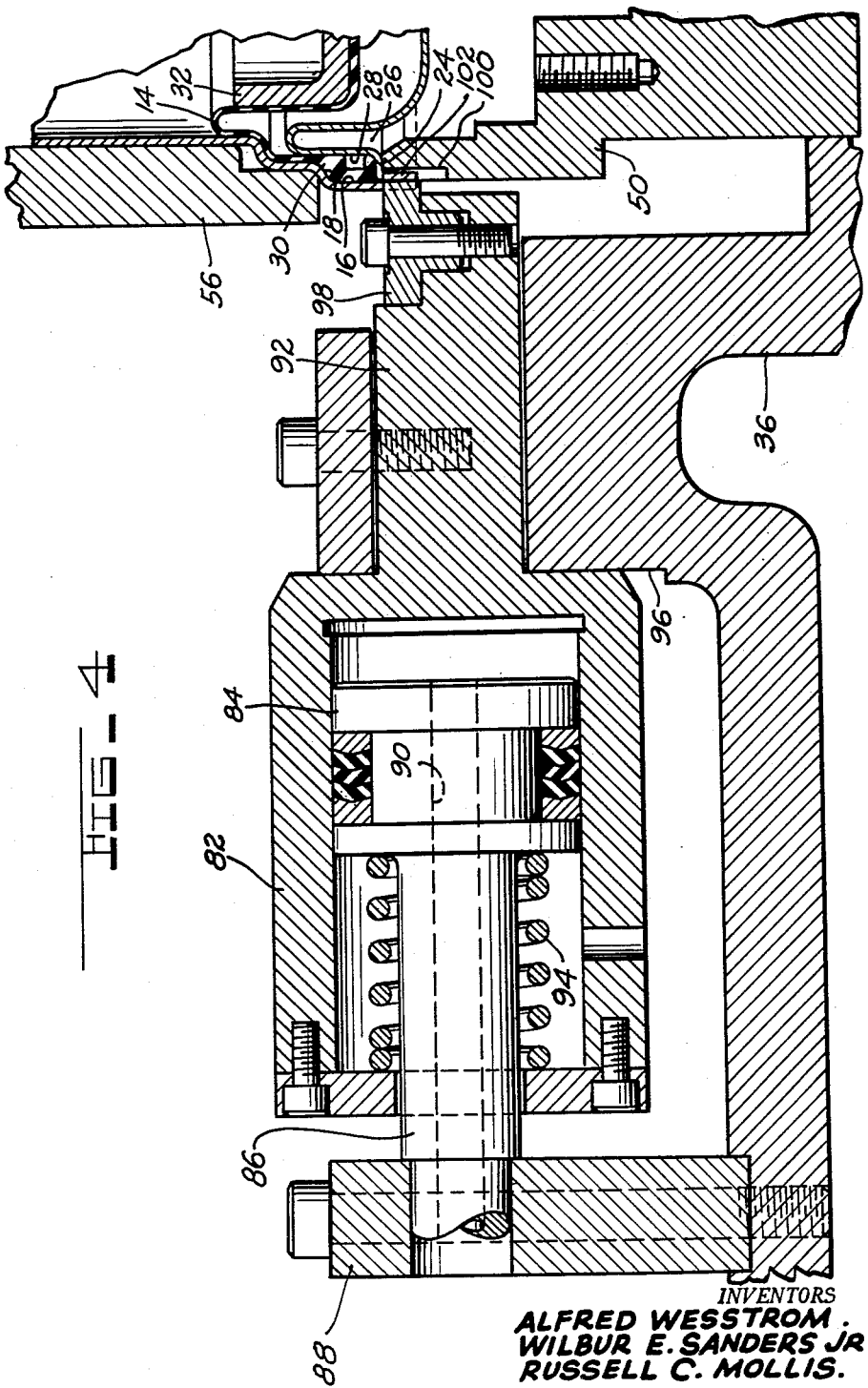

3,158,930
METHOD OF MANUFACTURING ASSEMBLY
FLUID PRESSURE MOTORS
Alfred Wesstrom, Wilbur E. Sanders, Jr., and Russell C. Mollis, all of South Bend, Ind., assignors to The Bendix Corporation, South Bend, Ind., a corporation of Delaware
Filed May 1, 1961, Ser. No. 112,741
5 Claims. (Cl. 29—510)

The present invention relates to a new and improved method of manufacture and assembly of fluid pressure motors more particularly to a new and improved method of manufacturing and assembling fluid pressure servomotors of the type used to power actuate automotive braking systems.

In general the type of fluid pressure servomotor with which we are concerned comprises a rubber flexible diaphragm which is sandwiched between two stamped shell sections which form the housing of the fluid pressure servomotor. The prior art heretofore, and with which we are familiar, have used two general methods for assembling and holding these parts together. In the most commonly used method, the diaphragm is sandwiched between shell sections during assembly and the parts thereafter are clamped together by suitable adjustable fasteners which can be adjusted to provide the desired gasketing pressure upon the rubber diaphragm. In the other method with which we are familiar, the use of adjustable fasteners has been obviated by providing the two shell sections with different stamped configurations which will mesh together as by rotation of the shell parts after the parts have been telescoped together. The second described means for holding the shell sections together is shown and described in the Price et al. application 39,932, now Patent No. 3,083,698. The means shown and described in application 39,932, now Patent No. 3,083,698, has the advantage over threaded fasteners of eliminating parts and simplifying the assembly operation. One serious disadvantage, however, of the structure shown in application 39,932, now Patent No. 3,083,698, occurs by reason of the "stack-up" of tolerances that must necessarily be provided for each of the parts when made by mass production methods; so that when the various parts are assembled, the amount of gasketing pressure upon the rubber diaphragm is not uniform between units, and in fact, in some instances, provides no gasketing pressure at all.

It should further be noted that the prior art fluid pressure motors, of which the unit shown in the Price et al. application 39,932, now Patent No. 3,083,698, is an example, have used threaded adjustment nuts on the motor's push rod for adjusting the projection of the push rod out of the servomotor after the unit has been assembled. This projection of the push rod of the servomotor out of its shell must be maintained quite accurately, where the unit is to be bolted onto a conventional master cylinder; in order that the fluid displacing piston of the master cylinder will assume a retracted position immediately rearwardly of the compensating port of the master cylinder. The retracted position of the fluid displacing piston must be accurately positioned adjacent the compensating port in order that the foot pedal lever travel used in closing off the compensating port will be held to a minimum. In all prior art fluid pressure servomotors with which we are familiar, it has been necessary to adjust this projecting length of the push rod after the assembly of the servomotor.

An object of the present invention is the provision of a new and improved method of manufacture and assembly of fluid pressure motors of the above mentioned type wherein a predetermined gasketing pressure upon the diaphragm is automatically provide in each assembled fluid pressure motor without the use of threaded fasteners.

Another object of the present invention is the provision of a new and improved method of manufacture of fluid pressure motors of the above described type wherein an interlocking shell arrangement is formed after assembly for holding the shell sections together, and which arrangement is made in a manner which does not require a complicated conventional die structure envoling a plurality of cam actuated shell piercing pins for providing the interlocking structure.

A further object of the present invention is the provision of a new and improved method of manufacture and assembly of fluid pressure motors of the above described type which will automatically provide the desired projection of the push rod out of the shell of the servomotor, obviating the necessity of further adjustments subsequent to the assembly operation.

Further objects and advantages of the present invention will become apparent to those skilled in the art to which the invention relates from the following description of the preferred process of manufacture and assembly of a typical fluid pressure motor hereinafter described with reference to the accompanying drawings forming a part of this specification, and in which:

FIGURE 1 is an exploded view showing the principal parts of a typical fluid pressure servomotor about to be assembled according to principles of the present invention;

FIGURE 2 is a vertical cross sectional view of a fixture used to assemble the elements shown in FIGURE 1 according to principles of the present invention;

FIGURE 3 is a horizontal cross sectional view taken approximately along the line 3—3 of FIGURE 2;

FIGURE 4 is an enlarged fragmentary view of a portion of the structure seen in FIGURES 2 and 3; and FIGURE 5 is an end view of a finished assembled servomotor.

While the principles of the present invention may be used in the manufacture of various types of fluid pressure motors, it is herein shown and described as used in the manufacture of the fluid pressure servomotor shown and described in the Robert R. Hager application Serial No. 98,472 filed March 27, 1961, now abandoned.

The fluid pressure servomotor shown in the above mentioned patent application generally comprises a cup-shaped shell section 10 and a cover section 12 between which the outer periphery of a flexible power diaphragm 14 is sandwiched. Where the principles of the present invention are utilized in the assembly of this structure, the cup-shaped shell section 10 is provided with cylindrical sidewalls 16 between its internal outwardly facing abutment shoulder 18 and its open end. The cover section 12 is provided with a radially turned flange portion 20 which is scalloped to from cutout portions 22 at uniformly spaced intervals around the flange 20 to provide a plurality of equally spaced fingers 24 whose outer periphery have a sliding fit with respect to the cylindrical sidewall 16 of the cup-shaped shell section 10. The cover section 12 further includes an annular indentation 26 which provides a cylindrical surface 28 that can be used in some instances to squeeze the flexible power diaphragm 14 against the internal sidewalls of the cup-shaped shell section 10 inwardly of the shoulder 18 to effect a vacuum tight seal therewith. The outer peripheral bead 30 of the diaphragm is intended to be confined between the cylindrical sidewalls 16, the cylindrical surface 28, and shoulders 18 and 20 to provide a gasketing pressure for the cover section 12 which will hold it securely. The fluid pressure motor shown in the drawings further includes a diaphragm stiffening plate 32 having a push rod 34 thereon which must project out of the shell section 10 by a predetermined amount in the final adjusted assembled condition of the fluid pressure servomotor.

According to principles of the present invention, the shell, diaphragm and cover section are telescoped together in the manner generally indicated in FIGURE 1, so as to automatically provide a fluid tight seal between the diaphragm, shell and cover sections. The shell and cover sections are compressed together until the push rod 34 projects out of the shell section 10 by the desired amount—following which, the shell sectoin 10 is deformed over the fingers 24 of the cover section 12 to hold the unit together in the desired assembled relationship. The biasing of the unit together, and the deforming of the shell over the cover section 12, can be done in any suitable manner, as for example by hand; but as shown in the drawing, is preferably done in a single fixture which will deform the shell simultaneously at all of the necessary points after the unit is squeezed and held together in the desired assembled relationship.

The fixture F shown in the drawings generally comprises a cast bed plate 36 which is suitably supported on a table 38. The bed plate 36 has four posts 40 suitably supported thereon and which in turn support a head structure 42 above the bed plate 36. A support ring 44 is positioned on the bed plate 36 between the posts 40 for supporting a cover plate 12 during the assembly operation. The support ring 44 has a suitable opening 46 therethrough adapted to receive the portion of the servomotor unit U which projects out through the cover section 12. The support ring 44 also includes an axially extending flange 50 which is adapted to press the flange 20 of the cover plate up into the open end of the shell section 10 and which also has a sliding fit with the inside cylindrical sidewall 16 of the shell section 10 for purposes which will later be explained.

The fixture F further includes a movable ring 52 which is adapted to bias the shell section 10 down over the cover section 12. The movable ring 52 includes a deep internal opening 54 adapted to receive the shell section 10, and an axially extending annular flange 56 which slips over the shell section 10 and seats up against the deformed section of the shell 10 which forms the shoulder 18. It will therefore be seen that the axial flanges 50 and 56 of the support and movable rings 44 and 52 respectively, serve the function of biasing the cover and shell sections together. The movable ring 52 also has two vertical guide posts 58 which are suitably fixed to the movable ring 52 and which project up through guide bushings 60 mounted in the head structure 42. One of the guide posts 58 is provided with a suitable stop 62 on its portion projecting upwardly out of the head structure 42 for purposes which will later be explained.

The movable ring 52 is actuated by means of a piston rod 64 that is suitably bolted to the movable ring 52 and which projects out of a hydraulic cylinder 66 that is fastened to the top surface of the head structure 42. The piston rod 64 is of course attached to a suitable piston positioned in the cylinder 66; and when fluid pressure is exerted against the bottom surface of the piston from the pump P, movable ring 52 is moved upwardly to adjacent head structure 42. When fluid pressure is supplied to the upper surface of the piston the movable ring 52 is forced downwardly to squeeze the portions of the servomotor units U together. Upward movement of the ring 52 is stopped short of the head structure 42 by means of a limit switch 68 which is contacted by a stop 70 mounted on the ring 52 in a suitable position to abut the projecting button 72 of the limit switch. The limit switch 68 is electrically connected to the solenoid valve $V_1$ to cut off the flow of hydraulic pressure to the lower end of the hydraulic cylinder 66.

Assembly of the unit U is started with the movable ring 52 in its upper position adjacent the limit switch 68. A cover section 12 is laid upon the support ring 44 and a movable wall including the flexible power diaphragm 14 is placed on the cover section 12 with the periphery of the flexible diaphragm 14 snapped over the annular indentation 26. The shell section 10 is in turn placed over the diaphragm structure 14 with the push rod 34 projecting upwardly out through a suitable opening in the shell section 10. Thereafter, the operator of the fixture turns the two way valve 74 to bleed pressure from the pump P into the upper end of the hydraulic cylinder 66 to force the movable ring 52 downwardly against the shell section 10. At the same time the two way valve 74 returns flow from the bottom side of the piston to the storage tank T. The movable ring 52 continues to move downwardly to press the cover section 10 over the cover section 12 until the push rod 34 projects out of the shell section 10 by a predetermined amount; whereupon the push rod 34 operates the button 76 of another limit switch 78 which energizes solenoid valve $V_2$ and stops the flow of hydraulic fluid to the upper end of the hydraulic cylinder 66. Once the shell and cover section have been forced together to give the desired projection of the push rod 34 out of the shell section 10, the operator opens a valve 80 which supplies hydraulic pressure to a plurality of hydraulic cylinders 82 which are spaced around the head plate 36 to deform the shell 10 over the cover section 12. Hydraulic pressure flows from the pump P through valve 80 to a header ring H which extends around the cylinders 82. Each of the hydraulic cylinders 82 include a piston 84 having an integral piston rod 86 which projects out of the cylinder 82 and is fastened to the bed plate 36 by means of a bracket 88. The piston rod 86 includes an axial opening 90 therethrough through which fluid pressure is fed from the header H to the inner end of the hydraulic cylinder 82. The hydraulic cylinder is therefore movable over the stationary piston 84, and carries a suitable punching tool 92 which is adapted to abut the shell section 10 and deform it inwardly over the cover section 12. The hydraulic cylinders 82 are biased to their retracted position by means of a return coil spring 94, and the deformation of the shell section 10 is limited by the abutment of the cylinder 82 against a suitable shoulder 96 on the base plate 36. The punching tool 92 may be formed with a suitably shaped solid punching edge, but is preferably formed as a circular punching washer 98 rotatably fastened to the projection 92, so that the punching tool can be rotated periodically to provide a new sharp punching or shearing edge. It should be pointed out that the cover plate 12 is suitably positioned on the support ring 44 so that its fingers 24 lie opposite to the cylinders 82.

According to the principles of the present invention, applicants have discovered that the outside edge of the flange 20 of the cover plate 12 can be used in place of one portion of a die to produce a shearing of the sidewalls 16 of the shell section 10. The axial flange 50 of the lower support ring 44 generally supports the side walls 16 intermediate the punches 98; and the axial flange 50 is notched out opposite the punches 98 to provide sufficient clearance 100 into which the shell can be deformed by the punches 98. Inasmuch as the punching tools 98 are circularly shaped, the sidewalls 16 of the shell will be sheared in line with the outer face of the cover 12 to provide slight cylindrical indentations 102 which support the cover 12 in its adjusted, clamped position. Applicants' discovery that the cover plate 12 will act as a shearing edge for the shell 10 makes possible applicants' method of assembly to a predetermined position of its internal parts. By referring to FIGURE 5 of the drawings it will be seen that the shell 10 of the finished assembled fluid pressure servomotor has been deformed to a shape which will permit the cover plate 12 to be rotated subsequent to assembly to align the scallops 22 with the indentations 102 and thereby permit the removal of the cover plate 12 out of the opened end of the shell section 10. Thereafter the unit may be repaired, the cover member 12 again pressed into the shell section 10, and rotated to bring the fingers 24 in behind the indentations 102 to lock the unit together.

It will be apparent that the objects heretofore enumerated as well as others have been accomplished; and that there has been provided a method by which a fluid pressure motor can be assembled to a predetermined positioning of its parts, and after which the shell section can be deformed in a manner which will permit the unit to be disassembled without further deformation or uncrimping of the parts. It will further be seen, that the shell can be sheared by the peripheral edge of the cover plate; and that this makes possible a holding of the parts firmly in an accurately adjusted position. In some instances the principles of the present invention may be used to assemble the fluid pressure motors to a predetermined gasketing pressure between the cover and shell sections, rather than to an adjusted position of the internal parts of the fluid pressure motor.

While the invention has been described in considerable detail, we do not wish to be limited to the particular sequence of operations or structure used to perform these operations; and it is our intention to cover hereby all novel adaptations, modifications and arrangements thereof which will come within the practice of those skilled in the art to which the invention relates.

We claim:

1. A method of manufacture of fluid pressure motors comprising: providing a stamped generally cup-shaped shell with an internal generally outwardly facing abutment surface positioned adjacent the open end of said shell, providing a cover member with a radially outwardly extending flange portion with spaced cutout portions, said flange portion being sized to have a sliding fit with the portion of said shell outwardly of said abutment surface, inserting a flexible diaphragm and said cover plate into said shell with the periphery of said diaphragm positioned between said abutment surface and said cover plate, forcing said cover plate into said shell to compress said periphery of said diaphragm between said cover and abutment surface by a desired amount, and limitatively deforming said shell inwardly equal to a depth of said cutout portions of said flange portion against the outside surface of said cover plate at points spaced between said cutout portions about the periphery of said shell to hold said shell and cover plate in controlled assembled relationship whereby the spaced deformed portions of the shell are alignable with said cutout portions on the cover to permit disassembly of said shell and cover member.

2. A method of manufacture of fluid pressure motors comprising: providing a stamped generally cup-shaped shell with an internal generally outwardly facing abutment surface positioned adjacent the open end of said shell, providing a cover member with a radially outwardly extending flange portion having a sliding fit with the portion of said shell outwardly of said abutment surface, which flange portion is cut out at spaced points about the periphery thereof, inserting a flexible diaphragm and said cover plate into said shell with the periphery of said diaphragm positioned between said abutment surface and said flange, forcing said cover plate into said shell to compress said periphery of said diaphragm between said flange and abutment surface by a desired amount, and limitatively deforming said shell inwardly to a depth equal to the cutout in said flange portion against the outside surface of said flange at points spaced between said spaced cutout portions about the periphery of said shell to cause the outside peripheral edge of said flange to shear said shell and provide a sheared edge which tightly abuts said flange and holds said shell and cover plate in controlled assembled relationship whereby the deformed sheared edges of the shell are alignable with said cutout portions of the cover to permit disassembly of said shell and cover member.

3. A method of manufacture of fluid pressure motors comprising: providing a stamped generally cup-shaped shell with an internal generally outwardly facing abutment surface positioned adjacent the open end of said shell, providing a cover member with a radially outwardly extending flange having spaced cutout portions, which flange has a sliding fit with the portion of said shell outwardly of said abutment surface, inserting a flexible diaphragm and said cover plate into said shell with the periphery of said diaphragm positioned between said abutment surface and said flange, forcing said cover plate into said shell to compress said periphery of said diaphragm between said flange and abutment surface together to produce a desired predetermined gasket pressure, and deforming said shell inwardly a depth equal to the depth of said cutout portions in said flange against the outside surface of said flange at points spaced between said spaced cutout portions about the periphery of said shell to hold said shell and cover plate in controlled assembled relationship whereby the spaced deformations of the shell are alignable with said cutout portions on the cover to permit disassembly of said shell and cover member.

4. A method of manufacture of fluid pressure motors comprising: providing a stamped generally cup-shaped shell with an internal generally outwardly facing abutment surface positioned adjacent the open end of said shell, providing a cover member with a radially outwardly extending flange having spaced cutout portions, which flange has a sliding fit with the portion of said shell outwardly of said abutment surface, providing a movable wall for said fluid pressure motor which includes a flexible diaphragm portion on its periphery, placing said movable wall and cover members into said shell with the periphery of said diaphragm positioned between said cover member and said abutment surface, forcing said cover member against movable wall to compress said periphery of said diaphragm therebetween until said movable wall reaches a predetermined position with respect to said shell, and deforming said shell inwardly a depth equal to said spaced cutout portions against the outside peripheral edge of said cover member at points spaced between said spaced cutout portions about the periphery of said shell to hold said cover plate and movable wall in its predetermined position whereby the spaced deformations of the shell are alignable with said cutout portions on the cover to permit disassembly of said shell and cover member.

5. A method of manufacture of fluid pressure motors comprising: providing a stamped generally cup-shaped shell with an internal generally outwardly facing abutment surface positioned adjacent the open end of said shell, providing a cover member having a radially outwardly extending flange portion having a sliding fit with the portion of said shell outwardly of said abutment surface, which flange is provided with spaced cutout portions providing a movable wall for said fluid pressure motor which includes a flexible diaphragm portion on its periphery, placing said movable wall and cover members into said shell with the periphery of said diaphragm positioned between said cover member and said abutment surface, forcing said cover member against movable wall to compress said periphery of said diaphragm therebetween until said movable wall reaches a predetermined position with respect to said shell, and limitatively deforming said shell inwardly against the outside peripheral edge of said flange at points spaced between said spaced cutout portions about the periphery of said shell to cause the outside peripheral edge of said flange to shear said shell and provide a sheared edge which holds said cover plate and movable wall in its predetermined position, which sheared edge when aligned with said cutout portions permits disassembly of said shell and cover member.

References Cited in the file of this patent

UNITED STATES PATENTS

| | | |
|---|---|---|
| 599,492 | Carter | Feb. 22, 1898 |
| 2,032,563 | Clifford et al. | Mar. 3, 1936 |
| 2,733,572 | Butterfield et al. | Feb. 7, 1956 |